US012601558B1

(12) United States Patent
Haselhuhn et al.

(10) Patent No.: US 12,601,558 B1
(45) Date of Patent: Apr. 14, 2026

(54) FIREARM CLEANING FLUIDS

(71) Applicant: FISKE BROTHERS REFINING COMPANY, Newark, NJ (US)

(72) Inventors: Howard James Haselhuhn, Grosse Ile, MI (US); Syed B. Mehdi, Sylvania, OH (US); David Birdwell, Toledo, OH (US)

(73) Assignee: FISKE BROTHERS REFINING COMPANY, Newark, NJ (US)

( * ) Notice: Subject to any disclaimer, the term of this patent is extended or adjusted under 35 U.S.C. 154(b) by 0 days.

(21) Appl. No.: 19/089,586

(22) Filed: Mar. 25, 2025

(51) Int. Cl.
*F41A 29/00* (2006.01)
*C11D 3/04* (2006.01)
*C11D 3/37* (2006.01)

(52) U.S. Cl.
CPC .............. *F41A 29/00* (2013.01); *C11D 3/044* (2013.01); *C11D 3/3749* (2013.01); *C11D 2111/16* (2024.01)

(58) Field of Classification Search
CPC ....... F41A 29/00; C11D 3/044; C11D 3/3749; C11D 2111/16
See application file for complete search history.

(56) References Cited

U.S. PATENT DOCUMENTS 5,929,004 A * 7/1999 Ushijima ............... C11D 3/044 510/435
2006/0242881 A1* 11/2006 Riebling ................. F41C 27/00 42/95
2009/0139483 A1* 6/2009 Lockledge ............. F01M 11/03 184/6.21
2016/0075962 A1* 3/2016 Simonetti ............ C10M 141/12 508/156
2018/0066200 A1* 3/2018 Scherer ................ C10M 101/02
2023/0313063 A1* 10/2023 Rittig ................... C10M 107/34 508/579

FOREIGN PATENT DOCUMENTS

CA 2065459 A1 * 3/1991 ............... C09D 5/08
CN 104531291 A * 4/2015
CN 104629880 A * 5/2015
CN 105779080 A * 7/2016 .......... C10M 141/06
CN 106164228 A * 11/2016 ........... C11D 3/0073
CN 109440120 A * 3/2019 ............... C23G 1/16
CN 116751617 A * 9/2023 ........ C10M 169/048
JP 2008189878 A * 8/2008
RU 2723631 C1 * 6/2020 ............... C23G 1/18

OTHER PUBLICATIONS

CN 104531291 A, Machine Translation. (Year: 2025).*
CN 104629880 A, Machine Translation. (Year: 2025).*
CN 116751617 A, Machine Translation. (Year: 2025).*
RU 2723631, Machine Translation. (Year: 2025).*
JP 2008189878 A, Machine Translation. (Year: 2025).*
CN 105779080, Machine Translation. (Year: 2025).*
CN 109440120 A, Machine Translation. (Year: 2025).*
CN 106164228 A, Machine Translation. (Year: 2025).*

* cited by examiner

*Primary Examiner* — Duy Vu N Deo
*Assistant Examiner* — Christopher Remavege
(74) *Attorney, Agent, or Firm* — Sheppard, Mullin, Richter & Hampton LLP

(57) ABSTRACT

Cleaning fluids and methods are provided for cleaning a firearm. In examples, a firearm cleaning fluid may comprise an emulsion. The emulsion may include ammonium hydroxide and a sulfurized olefin. The sulfurized olefin may be in an amount less than about 30 weight percent based on the total weight of the firearm cleaning fluid.

18 Claims, 1 Drawing Sheet

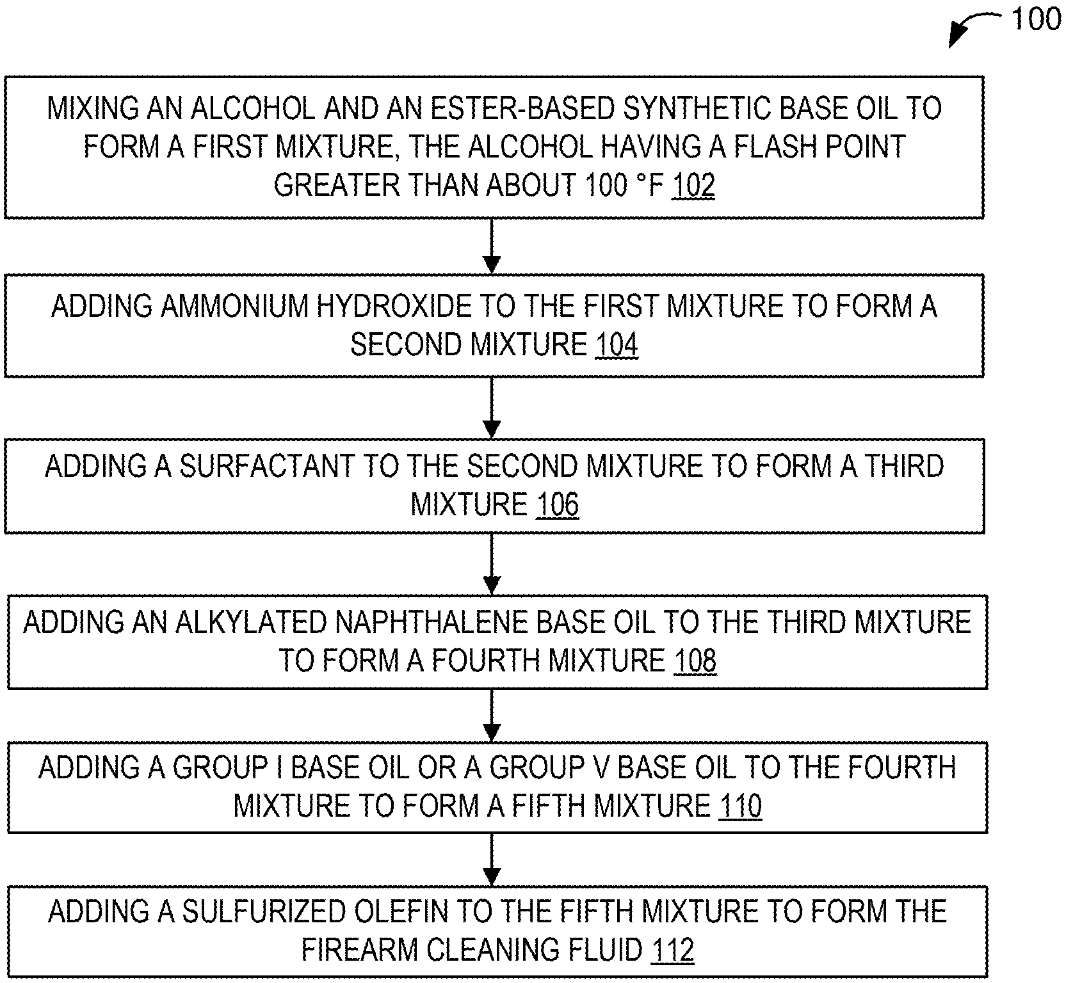
100
MIXING AN ALCOHOL AND AN ESTER-BASED SYNTHETIC BASE OIL TO FORM A FIRST MIXTURE, THE ALCOHOL HAVING A FLASH POINT GREATER THAN ABOUT 100 °F 102
ADDING AMMONIUM HYDROXIDE TO THE FIRST MIXTURE TO FORM A SECOND MIXTURE 104
ADDING A SURFACTANT TO THE SECOND MIXTURE TO FORM A THIRD MIXTURE 106
ADDING AN ALKYLATED NAPHTHALENE BASE OIL TO THE THIRD MIXTURE TO FORM A FOURTH MIXTURE 108
ADDING A GROUP I BASE OIL OR A GROUP V BASE OIL TO THE FOURTH MIXTURE TO FORM A FIFTH MIXTURE 110
ADDING A SULFURIZED OLEFIN TO THE FIFTH MIXTURE TO FORM THE FIREARM CLEANING FLUID 112

FIREARM CLEANING FLUIDS

TECHNICAL FIELD

The present disclosure relates generally to cleaning fluids, and in particular, some implementations may relate to firearm cleaning fluids.

DESCRIPTION OF RELATED ART

Firearms may experience a buildup of carbon deposits following the discharge of ammunition within the firearms. For example, a firearm's bore may be fouled by carbon deposits from the ignition of gunpowder. In addition, the firearm's bore may experience copper, lead, or copper and lead fouling from a bullet traveling down the firearm's bore and leaving behind traces of the bullet's outer surface (e.g., traces of a copper jacket). Carbon, copper, and lead fouling in firearms may cause, for example, decreased muzzle velocity and energy, decreased accuracy, and bore degradation (e.g., formation of rust and pitting).

BRIEF SUMMARY OF THE DISCLOSURE

In one aspect, a firearm cleaning fluid may include ammonium hydroxide. The firearm cleaning fluid may further include a sulfurized olefin in an amount less than about 30 weight percent based on the total weight of the firearm cleaning fluid.

In another aspect, a method of cleaning a component of a firearm may include applying, to the component of the firearm, a cleaning fluid. The cleaning fluid may include ammonium hydroxide. The cleaning fluid may further include a sulfurized olefin in an amount greater than about 5 weight percent and less than about 30 weight percent based on the total weight of the cleaning fluid.

In a further aspect, a method of generating a firearm cleaning fluid may include mixing an alcohol and an ester-based synthetic base oil to form a first mixture, the alcohol having a flash point of greater than about 100° F.; adding ammonium hydroxide to the first mixture to form a second mixture; adding a surfactant to the second mixture to form a third mixture; adding an alkylated naphthalene base oil to the third mixture to form a fourth mixture; adding a Group I base oil or a Group V base oil to the fourth mixture to form a fifth mixture; and adding a sulfurized olefin to the fifth mixture to form the firearm cleaning fluid.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figure. The figure is provided for purposes of illustration only and merely depict typical or example embodiments.

FIG. 1 illustrates an example method for generating a firearm cleaning fluid, in accordance with an aspect of the disclosure.

The figure is not exhaustive and does not limit the present disclosure to the precise form disclosed.

DETAILED DESCRIPTION

As alluded to above, a firearm's bore may experience carbon fouling and copper, lead, or copper and lead fouling following the discharge of ammunition in the firearm. Moreover, carbon, copper, and lead fouling in firearms may cause, for example, decreased muzzle velocity and energy, decreased accuracy, and bore degradation (e.g., formation of rust and pitting). A variety of conventional firearm cleaners—specifically firearm bore cleaners—may be used to remove carbon, copper, and lead fouling from a bore of a firearm. However, these conventional bore cleaners may have various undesirable characteristics. For example, conventional bore cleaners may have low flash points due to including kerosene (which has a flash point that is between about 99° F. and about 149° F.) and a flammable alcohol such as ethanol (which has a flash point of about 49° F.). In addition, conventional bore cleaners may include various additives that may help to remove carbon, copper, or lead fouling but that also degrade common steel alloys used in firearms over time such as additives that include, for example, primary amines, secondary amines, polyetheramines, dithiophosphates, or overbased calcium sulfonates.

As provided herein, the present inventors have developed firearm cleaning fluids that help to remove carbon, copper, and lead fouling while having a high flash point (e.g., at least 200° F.) and resulting in little to no iron loss in barrel steel over time. More specifically, the present inventors have discovered that cleaning fluids comprising an emulsion having a high concentration (relative to supplier recommendations for use in oils and greases) of a sulfurized olefin (e.g., greater than 5 weight percent based on the total weight of the cleaning fluids) and a low concentration of ammonium hydroxide (e.g., less than 1 weight percent based on the total weight of the cleaning fluids) may, for example, remove copper and lead more effectively than conventional bore cleaners.

In addition, the present inventors have discovered that utilizing the sulfurized olefin in an emulsion results in faster and more effective removal of copper and lead compared to conventional bore cleaners. For example, without being limited by theory, the sulfurized olefin (at the concentrations disclosed herein) in the emulsion may oxidize copper and lead and the ammonium hydroxide may draw the oxidized copper into the polar phase of the emulsion. Thus, the firearm cleaning fluids of this disclosure may comprise a two-part catalytic reaction. Unlike many conventional bore cleaners where copper is complexed in an additive, the firearm cleaning fluids of this disclosure may dissolve copper.

Although this disclosure frequently refers to cleaning firearm bores, in examples, the presently disclosed cleaning fluids may have additional uses such as cleaning carbon, lead, or copper fouling from other components of firearms such as a bolt carrier group (BCG) or a muzzle device (e.g., a muzzle brake, a flash hider, a compensator, a silencer/suppressor, etc.).

Example Terms

As used herein, the term "about" is intended to mean within 10% of the stated value.

As used herein, the term "substantially" is intended to mean significantly. Illustratively, a concentration of a component within a first composition which is substantially less than the concentration of that component within a second composition, means that the concentration of that component within the first composition is less than about 20% of the concentration within the second composition, e.g., less than about 10%, less than about 5%, less than 1%, or even less. As another example, a reaction that is performed using substantially only certain components means that of all the components which are present at the reaction, at least about 80%, at least about 90%, at least about 95%, at least about 98%, at least about 99%, or about 100% are the certain components.

Sulfurized Olefin

The firearm cleaning fluid (also may be referred to as a firearm bore cleaning fluid or a bore cleaning fluid) of this disclosure comprises a sulfurized olefin. The sulfurized olefin may comprise a sulfur carrier based on olefin/fatty oil chemistry. The sulfurized olefin may be soluble in Group I-V base oils (as classified by the American Petroleum Institute (API)). In examples, the sulfurized olefin may comprise NA-LUBE® EP-5425.

In examples, the sulfurized olefin may have a sulfur content from about 10 weight percent to about 30 weight percent, and preferably of about 27 weight percent based on the total weight of the sulfurized olefin. In examples, the sulfurized olefin may have an active sulfur content (measured according to ASTM D1662, which is incorporated herein by reference) from about 1 weight percent to about 20 weight percent, and preferably of about 17 weight percent. In examples, the sulfurized olefin may have a viscosity at 40° C. (measured according to ASTM D445, which is incorporated herein by reference) from about 200 cSt to about 1000 cSt, from about 300 cSt to about 900 cSt, or from about 500 cSt to about 800 cSt, and preferably of about 790 cSt. In examples, the sulfurized olefin may have a flash point, COC (measured according to ASTM D92, which is incorporated herein by reference) of about 311° F.

The amount of the sulfurized olefin in the firearm cleaning fluid may be less than about 30 weight percent based on the total weight of the firearm cleaning fluid. In examples, the amount of the sulfurized olefin in the firearm cleaning fluid may be greater than about 5 weight percent and less than about 30 weight percent based on the total weight of the firearm cleaning fluid. In examples, the amount of the sulfurized olefin in the firearm cleaning fluid may be from about 7 weight percent to about 15 weight percent or from about 8 weight percent to about 13 weight percent based on the total weight of the firearm cleaning fluid. Without being limited by theory, at these concentrations, the sulfurized olefin may oxidize copper and lead to a soluble form thereby facilitating the dissolution of the copper and lead.

Ammonium Hydroxide

The firearm cleaning fluid of this disclosure may further comprise ammonium hydroxide ($NH_4OH$). For example, the firearm cleaning fluid may comprise a sulfurized olefin and ammonium hydroxide. The ammonium hydroxide may comprise a solution of ammonia in water, with the ammonia being in an amount from about 1 weight percent to about 50 weight percent, or from about 25 weight percent to about 35 weight percent, or about 30 weight percent based on the total weight of the solution.

The amount of the ammonium hydroxide in the firearm cleaning fluid may be less than about 6 weight percent, less than about 3 weight percent, or less than about 1 weight percent based on the total weight of the firearm cleaning fluid.

Base Oil

The firearm cleaning fluid of this disclosure may further comprise a base oil. For example, the firearm cleaning fluid may comprise a sulfurized olefin, ammonium hydroxide, and a base oil. In examples, the base oil may comprise a base stock oil or a blend of base stocks. The base oil may, for example, comprise a mineral oil or a naphthenic mineral oil. In examples, the base oil may comprise a Group V, severely hydrotreated naphthenic base oil. In examples, the base oil may comprise HyGold 40. In examples, the base oil may comprise a Group I base oil. In examples, the base oil may comprise a diester, a polyolester, a trimethylolpropane (TMP) ester, a polyalkylene glycol, an alkylated naphthalene, a distillate aromatic extract, a polybutene, a phosphate ester, a polyether, an alkylated diphenyl, Isopar™, or terpenes such as limonene or pinene.

In examples, the base oil may have a low viscosity, such as a viscosity at 40° C. (measured according to ASTM D445) of less than about 20 cSt. In examples, the base oil may have a viscosity at 40° C. (measured according to ASTM D445) from about 2 cSt to about 5 cSt. In examples, the base oil may have a flash point, COC (measured according to ASTM D92) of about 218° F. to about 243° F. In examples, the base oil may have a low aniline point, such as an aniline point of less than about 100° C. (measured according to ASTM D611, which is incorporated herein by reference).

The amount of the base oil in the firearm cleaning fluid may be from about 20 weight percent to about 90 weight percent, from about 30 weight percent to about 80 weight percent, from about 40 weight percent to about 70 weight percent, or from about 50 weight percent to about 60 weight percent based on the total weight of the firearm cleaning fluid.

Alkylated Naphthalene Base Oil

The firearm cleaning fluid of this disclosure may further comprise an alkylated naphthalene base oil. For example, the firearm cleaning fluid may comprise a sulfurized olefin, ammonium hydroxide, a base oil, and an alkylated naphthalene base oil. The alkylated naphthalene base oil may comprise a synthetic base oil or a synthetic alkyl aromatic base oil modifier. In examples, the alkylated naphthalene may comprise NA-LUBE® KR-006FG. In examples, the alkylated naphthalene may comprise NA-LUBE® KR-008. Without being limited by theory, the alkylated naphthalene base oil may help to improve solvency for carbon as well as stabilize and improve performance of the firearm cleaning fluid by helping components to mix and preventing separation of components by increasing the solubility of the copper and/or lead removing components.

In examples, the alkylated naphthalene base oil may have a viscosity at 40° C. (measured according to ASTM D445) of about 35 cSt. In examples, the alkylated naphthalene base oil may have a flash point, COC (measured according to ASTM D92) of about 435° F.

The amount of the alkylated naphthalene base oil in the firearm cleaning fluid may be less than about 30 weight percent or less than about 20 weight percent based on the total weight of the firearm cleaning fluid.

Ester-Based Synthetic Base Oil

The firearm cleaning fluid of this disclosure may further comprise an ester-based synthetic base oil. For example, the firearm cleaning fluid may comprise a sulfurized olefin, ammonium hydroxide, a base oil, an alkylated naphthalene base oil, and an ester-based synthetic base oil. The ester-based synthetic base oil may comprise a low viscosity diester or polyol ester, for example. The ester-based synthetic base oil may comprise a synthetic base oil based on, for example, adipate ester, TMP ester, or pentaerythritol ester. In examples, the ester-based synthetic base oil may comprise a Group V synthetic dibasic ester base oil based on diisooctyl adipate. In examples, the ester-based synthetic base oil may comprise Esterex™ A32. Without being limited by theory, the ester-based synthetic base oil may, for example, help to dissolve/remove carbon. In examples, the ester-based synthetic base oil may help to remove cosmoline without the application of heat.

In examples, the ester-based synthetic base oil may have a low viscosity, such as a viscosity at 40° C. (measured according to ASTM D445) of less than about 20 cSt. In examples, the ester-based synthetic base oil may have a viscosity at 40° C. (measured according to ASTM D445) of about 9.5 cSt. In examples, the ester-based synthetic base oil may have a flash point, COC (measured according to ASTM D92) of about 405° F.

The amount of the ester-based synthetic base oil in the firearm cleaning fluid may be less than about 50 weight percent, less than about 40 weight percent, less than about 30 weight percent, less than about 20 weight percent, or less than about 10 weight percent based on the total weight of the firearm cleaning fluid.

High Flash Point Alcohol

The firearm cleaning fluid of this disclosure may further comprise an alcohol having a high flash point, such as a flash point, C.C. (measured according to ASTM D56, which is incorporated herein by reference) of greater than about 100° F. For example, the firearm cleaning fluid may comprise a sulfurized olefin, ammonium hydroxide, a base oil, an alkylated naphthalene base oil, an ester-based synthetic base oil, and a high flash point alcohol. Without being limited by theory, the high flash point alcohol may contribute to the high flash point of the firearm cleaning fluid. In examples, the high flash point alcohol may comprise a high flash point, low toxicity, low viscosity alcohol. In examples, the high flash point alcohol may comprise 2-ethylhexanol or another alcohol having a high flash point, low toxicity, and low viscosity similar to 2-ethylhexanol. Because of the modest polarity of 2-ethylhexanol, the 2-ethylhexanol may be soluble in both phases of the firearm cleaning fluid.

In examples, the high flash point alcohol may have a flash point, C.C. (measured according to ASTM D56) of about 140° F. to about 175° F.

The amount of the high flash point alcohol in the firearm cleaning fluid may be less than about 50 weight percent, less than about 40 weight percent, less than about 30 weight percent, less than about 20 weight percent, or less than about 10 weight percent based on the total weight of the firearm cleaning fluid.

Surfactant

The firearm cleaning fluid of this disclosure may further comprise a surfactant. For example, the firearm cleaning fluid may comprise a sulfurized olefin, ammonium hydroxide, a base oil, an alkylated naphthalene base oil, an ester-based synthetic base oil, a high flash point alcohol, and a surfactant. In examples, the surfactant may be either or both of an emulsifier or a stabilizer. The surfactant may, for example, comprise a non-ionic surfactant having an HLB of greater than about 10 or of about 15. In examples, the surfactant may comprise polyoxyethylene (20) sorbitan monooleate (i.e., polysorbate 80).

The amount of the surfactant in the firearm cleaning fluid may be less than about 6 weight percent, less than about 4 weight percent, less than about 2 weight percent, or less than about 1 weight percent based on the total weight of the firearm cleaning fluid.

Other Additives

In some examples, the firearm cleaning fluid may consist essentially of a sulfurized olefin, ammonium hydroxide, a base oil, an alkylated naphthalene base oil, an ester-based synthetic base oil, a high flash point alcohol, and a surfactant. In some examples, the firearm cleaning fluid may be substantially free of (e.g., the firearm cleaning fluid may not include) one or more of: a primary amine-containing compound; a secondary amine-containing compound; a polyetheramine-containing compound; a dithiophosphate-containing compound; or an overbased calcium sulfonate-containing compound. In some examples, the firearm cleaning fluid may be substantially free of (e.g., the firearm cleaning fluid may not include) a primary amine-containing compound, a secondary amine-containing compound, a polyetheramine-containing compound, a dithiophosphate-containing compound, and an overbased calcium sulfonate-containing compound.

Example Method

FIG. 1 illustrates an example method 100 for generating a firearm cleaning fluid (e.g., that may be applied to a component of a firearm), in accordance with an aspect of the present disclosure. The order of the operations of method 100 may, for example, help to improve stability of the resulting emulsion (i.e., the firearm cleaning fluid). The method 100 may include mixing an alcohol and an ester-based synthetic base oil to form a first mixture, the alcohol having a flash point greater than about 100° F. (operation 102). In examples, the alcohol is in an amount less than about 50 weight percent based on the total weight of the firearm cleaning fluid. In examples, the ester-based synthetic base oil is in an amount less than about 50 weight percent based on the total weight of the firearm cleaning fluid.

The method 100 may further include adding ammonium hydroxide to the first mixture to form a second mixture (operation 104). In examples, adding the ammonium hydroxide to the first mixture to form the second mixture may comprise adding the ammonium hydroxide to the first mixture and mixing the ammonium hydroxide with the first mixture at a speed sufficient to cause a vortex. In examples, the ammonium hydroxide is in an amount less than about 6 weight percent based on the total weight of the firearm cleaning fluid, the ammonium hydroxide comprising a solution having ammonia in an amount from about 1 weight percent to about 50 weight percent based on the total weight of the solution.

The method 100 may further include adding a surfactant to the second mixture to form a third mixture (operation 106). In examples, the surfactant may be added dropwise to a side of the vortex. In examples, adding the surfactant to the second mixture to form the third mixture may comprise adding the surfactant to the second mixture and mixing the surfactant with the second mixture for about 2 minutes to form a macroemulsion. In examples, the third mixture may comprise the macroemulsion. In examples, the surfactant is in an amount less than about 6 weight percent based on the total weight of the firearm cleaning fluid.

The method 100 may further include adding an alkylated naphthalene base oil to the third mixture to form a fourth mixture (operation 108). In examples, adding the alkylated naphthalene base oil to the third mixture may comprise adding the alkylated naphthalene base oil to the third mixture and mixing the alkylated naphthalene base oil with the third mixture until the mixture of the alkylated naphthalene base oil and the third mixture are homogenous. In examples, the alkylated naphthalene base oil is in an amount less than about 30 weight percent based on the total weight of the firearm cleaning fluid.

The method 100 may further include adding a Group I base oil or a Group V base oil to the fourth mixture to form a fifth mixture (operation 110). In examples, adding the Group I base oil or the Group V base oil to the fourth mixture may comprise adding the Group I base oil or the Group V base oil to the fourth mixture and mixing the Group I base oil or the Group V base oil with the fourth mixture until the mixture of the Group I base oil or the Group V base oil and the fourth mixture are homogenous. In examples, the Group I base oil or the Group V base oil is in an amount from about 20 weight percent to about 90 weight percent based on the total weight of the firearm cleaning fluid.

The method 100 may further include adding a sulfurized olefin to the fifth mixture to form the firearm cleaning fluid (operation 112). In examples, the sulfurized olefin may be added to the side of the vortex. In examples, adding the sulfurized olefin to the fifth mixture may comprise adding the sulfurized olefin to the fifth mixture and mixing the sulfurized olefin with the fifth mixture until cloudiness subsides forming a microemulsion. In examples, the firearm cleaning fluid may comprise the microemulsion. In examples, the sulfurized olefin is in an amount greater than about 5 weight percent and less than about 30 weight percent based on the total weight of the firearm cleaning fluid.

EXAMPLES

The following examples are intended to be purely illustrative, and not limiting of the present subject matter. Inventive and comparative cleaning fluids were subjected to the following test.

Solvency Test

The solvency performance of the inventive and comparative cleaning fluids was tested by placing the following into a clean, dry, 100 ml beaker: (i) 10 grams of 1 cm diameter AISI 4140 steel (ordnance steel containing 1% chromium, 0.25% molybdenum, 0.4% carbon, and 1% manganese as primary alloying metals in addition to iron); (ii) 10 grams 16-gauge copper wire (99.96% pure); (iii) 10 grams ¼ inch diameter lead wire; and (iv) 50 grams of respective cleaning fluid. The filled beakers were allowed to sit undisturbed for 7 days. Following the 7 days, the respective cleaning fluid was analyzed using a SpectrOil M Series rotating disc electrode optical emission spectrometer (RDE-OES). The result of this test provides an elemental analysis of metals within the sample. The primary metals of concern for the purpose of a firearm cleaner are, for example, copper, lead, iron, chromium, molybdenum, and manganese where higher levels of copper and lead are desirable and lower levels of iron, chromium, and manganese are desirable.

Comparative Example 1

Comparative Example 1 is a water based bore cleaner. The composition of Comparative Example 1 is provided in Table 1 below. The results of the solvency test for Comparative Example 1 are provided in Table 2 below.

TABLE 1

| Component | Weight Percent (based on the total weight of Comparative Example 1) |
|---|---|
| Water | 60-99% |
| D-limonene (Food Grade) | 1-20% |
| Non-ionic Surfactant | 1-10% |
| Mackamide C | 1-10% |
| Glycol Ether EB | 1-10% |

TABLE 2

| Element | ppm | Notes |
|---|---|---|
| Iron | 2.38 | |
| Copper | 2.79 | |
| Lead | 829.59 | Dissolved and precipitated |
| Molybdenum | 2.56 | |
| Chromium | 0 | |

Comparative Example 2

Comparative Example 2 is a petroleum based bore cleaner. The composition of Comparative Example 2 is provided in Table 3 below. The results of the solvency test for Comparative Example 2 are provided in Table 4 below.

TABLE 3

| Component | Weight Percent (based on the total weight of Comparative Example 2) |
|---|---|
| Kerosene (petroleum) | 30-60% |
| Ethanol | 10-30% |
| Propan-2-ol | 5-10% |
| Amyl Acetate | 1-5% |
| 2-methylbutyl acetat | 1-5% |
| Methanol | 1-5% |
| Ammonium Hydroxide | <1% |
| (R)-p-mentha-1,8-diene | <1% |
| 1,8 cineole | <1% |
| 4-methylpentan-2-one | <1% |
| Geraniol | <1% |
| Naphthalene | <1% |
| Nerol | <1% |
| Citronellol | <1% |
| p-Cymene | 0.121% |
| Diammonium peroxodisulphate | <1% |

TABLE 4

| Element | ppm | Notes |
|---|---|---|
| Iron | 360.91 | |
| Copper | 300.46 | |
| Lead | 496.85 | Dissolved |
| Molybdenum | 0 | |
| Chromium | 0.83 | |

Example 1

The composition of Example 1 is provided in Table 5 below. The results of the solvency test for Example 1 are provided in Table 6 below.

TABLE 5

| Component | Weight Percent (based on the total weight of Example 1) |
|---|---|
| HyGold 40 | 61.4% |
| KR-006FG | 17.5% |
| 2-ethylhexanol | 8.8% |
| NA-LUBE EP-5425 | 9.9% |
| $NH_4OH$ | 1% |
| SMO | 1.5% |

TABLE 6

| Element | ppm | Notes |
|---|---|---|
| Iron | 6.92 | |
| Copper | 2884 | |
| Lead | 45.87 | Tends to precipitate. SpectrOil cannot measure precipitates. |
| Molybdenum | 0.66 | |
| Chromium | 0.33 | |

Example 2

The composition of Example 2 is provided in Table 7 below. The results of the solvency test for Example 2 are provided in Table 8 below.

TABLE 7

| Component | Weight Percent (based on the total weight of Example 2) |
|---|---|
| HyGold 40 | 54% |
| KR-006FG | 18% |
| 2-ethylhexanol | 8.6% |
| NA-LUBE EP-5425 | 10.0% |
| $NH_4OH$ | 0.6% |
| SMO | 0.3% |
| Esterex A32 | 8.6% |

TABLE 8

| Element | ppm | Notes |
|---|---|---|
| Iron | 0.75 | |
| Copper | 1709 | |
| Lead | 107.34 | Tends to precipitate. SpectrOil cannot measure precipitates. |
| Molybdenum | 0 | |
| Chromium | 0 | |

Example 3

The composition of Example 3 is provided in Table 9 below. The results of the solvency test for Example 3 are provided in Table 10 below.

TABLE 9

| Component | Weight Percent (based on the total weight of Example 3) |
|---|---|
| HyGold 40 | 54.0% |
| KR-006FG | 18.0% |
| 2-ethylhexanol | 8.0% |
| NA-LUBE EP-5425 | 10.0% |

TABLE 9-continued

| Component | Weight Percent (based on the total weight of Example 3) |
|---|---|
| $NH_4OH$ | 1.0% |
| SMO | 1.0% |
| Esterex A32 | 8.0% |

TABLE 10

| Element | ppm | Notes |
|---|---|---|
| Iron | 4.5 | |
| Copper | 1895 | |
| Lead | 58.35 | Tends to precipitate. SpectrOil cannot measure precipitates. |
| Molybdenum | 0 | |
| Chromium | 0.37 | |

Example 4

The composition of Example 4 is provided in Table 11 below. The results of the solvency test for Example 4 are provided in Table 12 below.

TABLE 11

| Component | Weight Percent (based on the total weight of Example 4) |
|---|---|
| HyGold 40 | 59.0% |
| KR-006FG | 18.0% |
| 2-ethylhexanol | 8.6% |
| NA-LUBE EP-5425 | 5.0% |
| $NH_4OH$ | 0.6% |
| SMO | 0.3% |
| Esterex A32 | 8.6% |

TABLE 12

| Element | ppm | Notes |
|---|---|---|
| Iron | 0.52 | |
| Copper | 950.51 | |
| Lead | 31.35 | Tends to precipitate. SpectrOil cannot measure precipitates. |
| Molybdenum | 0 | |
| Chromium | 0 | |

Example 5

The composition of Example 5 is provided in Table 13 below. The results of the solvency test for Example 5 are provided in Table 14 below.

TABLE 13

| Component | Weight Percent (based on the total weight of Example 5) |
|---|---|
| HyGold 40 | 44.0% |
| KR-006FG | 18.0% |
| 2-ethylhexanol | 8.6% |
| NA-LUBE EP-5425 | 20.0% |
| $NH_4OH$ | 0.6% |

TABLE 13-continued

| Component | Weight Percent (based on the total weight of Example 5) |
|---|---|
| SMO | 0.3% |
| Esterex A32 | 8.6% |

TABLE 14

| Element | ppm | Notes |
|---|---|---|
| Iron | 1.40 | |
| Copper | 660.55 | |
| Lead | 39.66 | Tends to precipitate. SpectrOil cannot measure precipitates. |
| Molybdenum | 0 | |
| Chromium | 0 | |

Example 6

The composition of Example 6 is provided in Table 15 below. The results of the solvency test for Example 6 are provided in Table 16 below.

TABLE 15

| Component | Weight Percent (based on the total weight of Example 6) |
|---|---|
| HyGold 40 | 34.0% |
| KR-006FG | 18.0% |
| 2-ethylhexanol | 8.6% |
| NA-LUBE EP-5425 | 30.0% |
| $NH_4OH$ | 0.6% |
| SMO | 0.3% |
| Esterex A32 | 8.6% |

TABLE 16

| Element | ppm | Notes |
|---|---|---|
| Iron | 1.41 | |
| Copper | 171.26 | |
| Lead | 88.5 | Tends to precipitate. SpectrOil cannot measure precipitates. |
| Molybdenum | 0 | |
| Chromium | 0 | |

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A firearm cleaning fluid, comprising:

ammonium hydroxide in an amount of less than about 6 weight percent based on the total weight of the firearm cleaning fluid, the ammonium hydroxide comprising a solution having ammonia in an amount from about 1 weight percent to about 50 weight percent based on a total weight of the solution; and a sulfurized olefin in an amount less than about 30 weight percent based on the total weight of the firearm cleaning fluid.

2. The firearm cleaning fluid of claim 1, wherein the amount of the sulfurized olefin is greater than about 5 weight percent based on the total weight of the firearm cleaning fluid.

3. The firearm cleaning fluid of claim 2, wherein the amount of the sulfurized olefin is from about 7 weight percent to about 15 weight percent based on the total weight of the firearm cleaning fluid.

4. The firearm cleaning fluid of claim 1, further comprising one or more of:

a base oil;

a surfactant;

an alkylated naphthalene base oil;

an alcohol having a flash point of greater than about 100° F.; or an ester-based synthetic base oil.

5. The firearm cleaning fluid of claim 4, wherein the base oil is in an amount from about 20 weight percent to about 90 weight percent based on the total weight of the firearm cleaning fluid.

6. The firearm cleaning fluid of claim 5, wherein the base oil comprises a Group I base oil or a Group V base oil.

7. The firearm cleaning fluid of claim 4, wherein the surfactant is in an amount from about 0.3 weight percent to about 6 weight percent based on the total weight of the firearm cleaning fluid.

8. The firearm cleaning fluid of claim 4, wherein the alkylated naphthalene base oil is in an amount from about 17.5 weight percent to about 30 weight percent based on the total weight of the firearm cleaning fluid.

9. The firearm cleaning fluid of claim 4, wherein the alcohol is in an amount from about 8 weight percent to about 50 weight percent based on the total weight of the firearm cleaning fluid.

10. The firearm cleaning fluid of claim 4, wherein the ester-based synthetic base oil is in an amount from about 8 weight percent to about 50 weight percent based on the total weight of the firearm cleaning fluid.

11. The firearm cleaning fluid of claim 1, wherein the firearm cleaning fluid is substantially free of one or more of:

a primary amine-containing compound;

a secondary amine-containing compound;

a polyetheramine-containing compound;

a dithiophosphate-containing compound; or an overbased calcium sulfonate-containing compound.

12. A method of generating a firearm cleaning fluid, the method comprising:

mixing an alcohol and an ester-based synthetic base oil to form a first mixture, the alcohol having a flash point of greater than about 100° F.;

adding ammonium hydroxide to the first mixture to form a second mixture;

adding a surfactant to the second mixture to form a third mixture;

adding an alkylated naphthalene base oil to the third mixture to form a fourth mixture;

adding a Group I base oil or a Group V base oil to the fourth mixture to form a fifth mixture; and adding a sulfurized olefin to the fifth mixture to form the firearm cleaning fluid.

13. The method of claim 12, wherein:

the third mixture comprises a macroemulsion; and the firearm cleaning fluid comprises a microemulsion.

14. The method of claim 12, wherein the sulfurized olefin is in an amount greater than about 5 weight percent and less than about 30 weight percent based on the total weight of the firearm cleaning fluid.

15. The method of claim 14, wherein:

the alcohol is in an amount from about 8 weight percent to about 50 weight percent based on the total weight of the firearm cleaning fluid;

the ester-based synthetic base oil is in an amount from about 8 weight percent to about 50 weight percent based on the total weight of the firearm cleaning fluid;

the ammonium hydroxide is in an amount less than about 6 weight percent based on the total weight of the firearm cleaning fluid, the ammonium hydroxide comprising a solution having ammonia in an amount from about 1 weight percent to about 50 weight percent based on the total weight of the solution;

the surfactant is in an amount from about 0.3 weight percent to about 6 weight percent based on the total weight of the firearm cleaning fluid;

the alkylated naphthalene base oil is in an amount from about 17.5 weight percent to about 30 weight percent based on the total weight of the firearm cleaning fluid; and the Group I base oil or the Group V base oil is in an amount from about 20 weight percent to about 90 weight percent based on the total weight of the firearm cleaning fluid.

16. The method of claim 12, wherein the ammonium hydroxide is added to the first mixture while mixing at a speed sufficient to cause a vortex.

17. The method of claim 16, wherein the surfactant is added dropwise to a side of the vortex formed during mixing of the second mixture.

18. The method of claim 12, wherein the sulfurized olefin is added to the fifth mixture and mixed until the mixture is substantially homogenous and cloudiness subsides.

* * * * *